(12) United States Patent
Schwartz et al.

(10) Patent No.: US 9,623,370 B2
(45) Date of Patent: *Apr. 18, 2017

(54) INTEGRATED PROCESS AND APPARATUS FOR RECOVERY OF HELIUM RICH STREAMS

(71) Applicants: Joseph M. Schwartz, Williamsville, NY (US); Khushnuma Koita, Buffalo, NY (US); Minish M. Shah, East Amherst, NY (US)

(72) Inventors: Joseph M. Schwartz, Williamsville, NY (US); Khushnuma Koita, Buffalo, NY (US); Minish M. Shah, East Amherst, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 134 days.

This patent is subject to a terminal disclaimer.

(21) Appl. No.: 14/618,702

(22) Filed: Feb. 10, 2015

(65) Prior Publication Data

US 2016/0228813 A1     Aug. 11, 2016

(51) Int. Cl.
| | |
|---|---|
| *B01D 53/22* | (2006.01) |
| *B01D 53/047* | (2006.01) |
| *C01B 23/00* | (2006.01) |
| *B01J 19/24* | (2006.01) |

(52) U.S. Cl.
CPC ......... *B01D 53/229* (2013.01); *B01D 53/047* (2013.01); *B01D 53/226* (2013.01); *B01J 19/24* (2013.01); *C01B 23/0021* (2013.01); *C01B 23/0047* (2013.01); *B01D 2053/221* (2013.01); *B01D 2256/18* (2013.01); *B01D 2257/108* (2013.01); *B01J 2219/24* (2013.01); *C01B 2210/001* (2013.01); *C01B 2210/0004* (2013.01); *C01B 2210/007* (2013.01); *C01B 2210/0012* (2013.01); *C01B 2210/0031* (2013.01); *C01B 2210/0046* (2013.01);
(Continued)

(58) Field of Classification Search
CPC  B01D 53/226; B01D 53/229; B01D 2256/16; B01D 2256/18; B01D 2317/02; B01D 2317/022; B01D 2317/025; C01B 23/0021; C01B 23/0042; C01B 23/0047; C01B 2210/0004; C01B 2210/001; C01B 2210/0012; C01B 2210/0031; C01B 2210/0053; C01B 2210/007
USPC ................................. 95/53, 55, 56
See application file for complete search history.

(56) References Cited

U.S. PATENT DOCUMENTS

| | | | |
|---|---|---|---|
| 3,713,271 A * | 1/1973 | Franz ................ | B01D 53/226 95/53 |
| 3,780,496 A | 12/1973 | Ward, III et al. | |
| 3,807,185 A | 4/1974 | Forg et al. | |

(Continued)

FOREIGN PATENT DOCUMENTS

DE          3421833 A1    12/1985

*Primary Examiner* — Jason M Greene
(74) *Attorney, Agent, or Firm* — Iurie A. Schwartz (57) ABSTRACT

The present invention relates a process and apparatus that recovers a helium rich stream from a mixed gas having low concentrations of helium therein. More specifically, the invention relates to an integrated process and apparatus for treating a mixed feed gas from an operating process that produces a fluid product from natural gas containing helium, such as processes that produce ammonia, methanol, or liquid hydrocarbons.

28 Claims, 3 Drawing Sheets

(52) U.S. Cl.
CPC .............. *C01B 2210/0053* (2013.01); *C01B 2210/0082* (2013.01); *Y02P 20/125* (2015.11)

(56) References Cited

U.S. PATENT DOCUMENTS

| | | | | |
|---|---|---|---|---|
| 4,398,926 A * | 8/1983 | Doshi | ................. | B01D 53/229 95/103 |
| 4,659,351 A | 4/1987 | Stuber et al. | | |
| 4,675,030 A * | 6/1987 | Czarnecki | ............ | B01D 53/226 95/39 |
| 4,687,498 A * | 8/1987 | Maclean | .............. | B01D 53/229 62/624 |
| 4,717,407 A * | 1/1988 | Choe | .................. | B01D 53/229 210/500.21 |
| 5,064,446 A * | 11/1991 | Kusuki | ................ | B01D 53/226 95/53 |
| 5,080,694 A | 1/1992 | Knoblauch et al. | | |
| 5,089,048 A | 2/1992 | Knoblauch et al. | | |
| 5,224,350 A | 7/1993 | Mehra | | |
| 5,632,803 A | 5/1997 | Stoner et al. | | |
| 6,179,900 B1 | 1/2001 | Behling et al. | | |
| 6,281,403 B1 | 8/2001 | White et al. | | |
| 6,899,744 B2 | 5/2005 | Mundschau | | |
| 7,604,681 B2 | 10/2009 | Malsam et al. | | |
| 7,781,049 B2 | 8/2010 | Apte et al. | | |
| 7,871,577 B2 | 1/2011 | Allam et al. | | |
| 8,101,243 B2 | 1/2012 | Way et al. | | |
| 8,152,898 B2 | 4/2012 | Prasad et al. | | |
| 2005/0217479 A1 * | 10/2005 | Hale | .................... | B01D 53/228 95/53 |
| 2010/0101410 A1 * | 4/2010 | Prasad | .................. | C01B 3/0031 95/53 |
| 2013/0098242 A1 | 4/2013 | Ungerank et al. | | |
| 2014/0243574 A1 * | 8/2014 | Karode | ................ | B01D 53/226 585/818 |
| 2014/0345457 A1 * | 11/2014 | Balster | ................ | B01D 53/226 95/53 |

\* cited by examiner

INTEGRATED PROCESS AND APPARATUS FOR RECOVERY OF HELIUM RICH STREAMS

BACKGROUND OF THE INVENTION

Field of the Invention

The present invention relates to a process and apparatus that recovers a helium rich stream from a mixed gas having low concentrations of helium therein. More specifically, the invention relates to an integrated process and apparatus for treating a mixed feed gas from an operating process that produces a fluid product from natural gas containing helium, such as processes that produce ammonia, methanol, or liquid hydrocarbons.

Description of Related Art

Helium is a rare gas, which has unique physical properties making it valuable in a wide range of commercial applications. For instance, helium is inert, its boiling and melting points are the lowest among the elements, it is the second lightest element, and it exists only as a gas in all but the most cryogenic conditions. Commercial applications range from balloons to lasers and include heat transfer and cooling applications; shielding applications; gas tracing applications; inert environments for growing crystals; and numerous other applications. However, due to its limited availability and increasing commercial demand, its cost has increased significantly over the last few years.

While helium is the second most abundant element in the universe, it is extremely rare on Earth. In fact, it is a finite resource and is primarily found trapped with natural gas in concentrations up to about seven percent by volume although most often, it is found in concentrations of less than 0.5% by volume. Almost all of the commercial helium requirements are supplied by the extraction from helium-containing natural gas by low temperature fractional distillation processes. The resulting helium rich gases are further purified or refined using additional cryogenic distillation steps or by pressure swing adsorption (PSA) processes which selectively remove other gases. These final refining steps result in commercial grades of helium in excess of 99.9%.

The high cost and limited availability of helium gas has resulted in investigations to identify other sources of helium. The source most relevant to the present invention is hydrogen containing gas streams produced from or existing in various current commercial processes. Process gas streams such as those from the production of hydrogen, or which recycle hydrogen, can contain helium in concentrations which can be economically extracted and recovered. For example, processes for the production of synthesis gas ($CO/H_2$), which is typically further used in hydrogen production, ammonia production or used in certain Fischer-Tropsch reactions, typically begin with natural gas feed streams. The various processing and recycling steps do not normally separate the inert helium already present from the natural gas feed stream and it often accumulates in the processing steps. The resulting recycle and purge gas can contain helium in concentrations of up to 2% or more by volume.

Processes using multi-step cryogenic distillation or hybrid PSA systems for removing or extracting helium from natural gas or other gases containing low concentrations of helium are known. These processes are typically directed to natural gas feed streams and require significant capital investments and complex and expensive cryogenic distillation systems to generate the enriched helium gas streams which can be further processed or integrated into the starting extraction process. Similarly, related processes for the recovery of helium from refinery off gases have been taught.

In U.S. Pat. No. 3,807,185, helium containing vent gas from the synthesis of ammonia is subjected to several partial condensation steps and then cooled to remove the higher-boiling components, namely, methane, nitrogen, and argon in a phase separator. A low temperature stripping column is then employed to recover liquid hydrogen and a gaseous helium/hydrogen mixture. Hydrogen and argon can also be recovered. This process requires multiple cooling and heating steps and, the hydrogen feed stream must be condensed at extremely low temperatures requiring high capital equipment costs and high power requirements.

U.S. Pat. No. 5,089,048 discloses a method for extracting helium from a relatively helium poor gas mixture through a pressure swing adsorption process which allegedly achieves an enriched product gas containing over 50% helium.

U.S. Pat. No. 7,871,577 discloses a gas-to-liquids process where a hydrogen-helium mixture is produced by cryogenic separation. Specifically, higher molecular weight hydrocarbon compounds or oxygenates are produced from a gas comprising methane in a process including the steps of generating synthesis gas by reaction of a gas including methane with steam and/or an oxidant gas comprising oxygen, producing higher molecular weight hydrocarbon compounds or oxygenates in a syngas conversion process, removing offgas including unreacted hydrogen and unreacted carbon monoxide from the syngas conversion process and separating cryogenically unreacted hydrogen from the offgas or from a gas derived therefrom to produce separated hydrogen product that is substantially free of unreacted carbon monoxide and a first cryogenic liquid including unreacted carbon monoxide.

U.S. Pat. No. 8,152,898 discusses helium recovery from gas streams containing high concentrations of hydrogen gas and low concentrations of helium gas, such as from the recycle stream from the production of ammonia.

The related art discussed, above, does not address the recovery of a helium stream from an upstream process (e.g. ammonia plant or gas-to-liquids plant) where the offgas is processed through one or more hydrogen transport membranes in combination with a size selective polymeric membrane system.

The mixed offgas from the upstream source generally contains hydrogen, which has a very low boiling point (i.e., similar to helium), and which hinders the separation process. One of the advantages associated with the present invention is that through the employment of a hydrogen transport membrane, in the system of the present invention, the hydrogen-helium separation is achieved.

Other objects and aspects of the present invention will become apparent to one of ordinary skill in the art upon review of the specification, drawings and claims appended hereto.

SUMMARY OF THE INVENTION

In one aspect of the invention, an integrated system for recovery of a helium rich stream and a hydrogen rich stream from a feed stream containing 10-80 volume percent hydrogen, 0.1-5.0 volume percent helium, and the balance higher boiling components is provided. The system includes, (a) routing a compressed and warmed feed stream to a first hydrogen transport membrane system having one or more hydrogen transport membranes for carrying out the bulk separation between a first hydrogen permeate stream and a first helium-containing retentate stream; (b) cooling and routing the first helium-containing retentate stream to a size selective polymeric membrane system having one or more polymeric membrane stages to remove the higher boiling components and to produce a resulting second permeate stream composed of primarily hydrogen and helium and a second retentate stream; (c) compressing the resulting second permeate stream in step (b) and feeding same to a second hydrogen transport membrane system having one or more hydrogen transport membranes to further recover one or more hydrogen permeate streams and a helium rich retentate product having about 80% helium or higher volume by content.

In another aspect of the invention, an integrated system for recovery of a helium rich stream and a hydrogen rich stream from a feed stream containing 10-80 volume percent hydrogen, 0.1-5.0 volume percent helium, and the balance being higher boiling components is provided. The system includes (a) routing a compressed and warmed feed stream to a hydrogen transport membrane system having one or more hydrogen transport membranes for carrying out the bulk separation between a hydrogen permeate stream and a helium-containing retentate stream; (b) cooling the helium-containing retentate stream and processing same in at least one catalytic oxidation unit to remove substantially all the hydrogen in the helium-containing retentate stream; (c) routing the helium-containing retentate stream depleted of hydrogen to a phase separator to remove substantially all the water, and optionally a dryer disposed downstream of the phase separator to remove the remaining moisture; and (d) routing a dried helium-containing retentate stream from step (c) to a polymeric membrane system having one or more polymeric membrane stages and removing the higher boiling components to produce a helium rich product stream having about 80% or higher content by volume.

BRIEF DESCRIPTION OF THE FIGURES

The objects and advantages of the invention will be better understood from the following detailed description of the preferred embodiments thereof in connection with the accompanying figures wherein like numbers denote same features throughout and wherein.

DETAILED DESCRIPTION OF THE INVENTION

The present invention provides a system for the recovery of a helium rich stream from an off-gas feed stream coming from an upstream plant which produces either ammonia, methanol or liquid hydrocarbons. In these plant operating processes or units, the off-gas streams produced contain helium in a higher concentration than its concentration in the natural gas feed provided to the plant, because a liquid product containing no helium is removed from the operating process.

Figure 1:
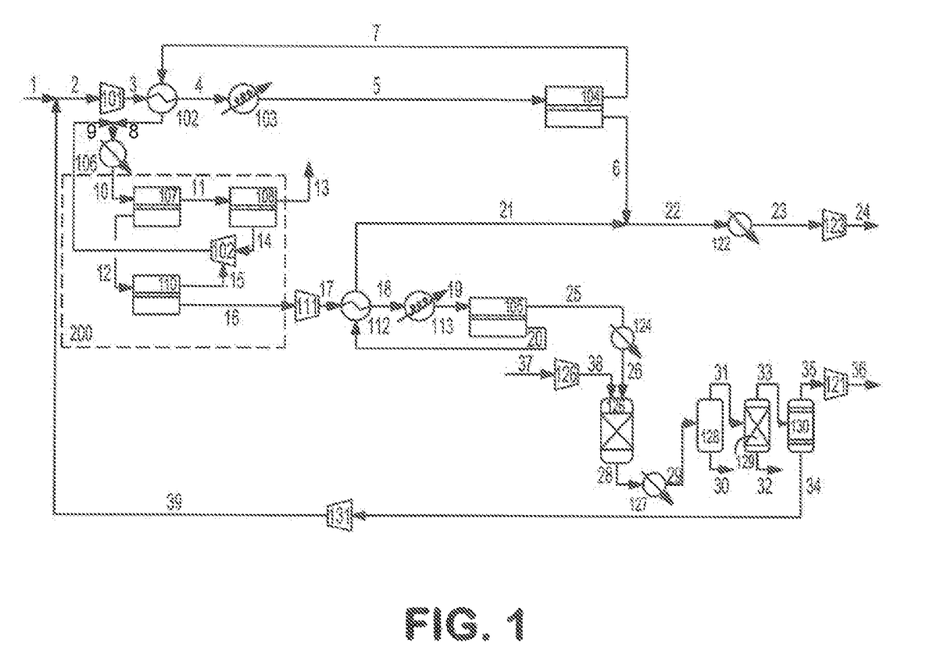
FIG. 1 is a graphical representation of an embodiment of the present invention including a size selective polymeric separation unit in combination with at least one hydrogen transport membrane.

With reference to FIG. 1, an exemplary embodiment of the invention is provided. A feed gas (1) containing helium, hydrogen, and at least one other component mixes, and optionally, with compressed tail gas (39) forming low-pressure mixed feed (2). The mixed gas contains helium, hydrogen, and at least one other higher-boiling component. As employed herein, a higher-boiling component will be understood by those skilled in the art to be a material that has a higher boiling point than both helium and hydrogen. Possible higher-boiling components include nitrogen, methane, argon, and carbon monoxide. For example, a mixed gas stream from ammonia production could contain about 30% hydrogen, 60% methane, and 10% nitrogen with about 1% helium. Another ammonia plant could remove methane and produce a mixed gas with about 70% hydrogen, 23% nitrogen, 6% argon, and 1% helium. A mixed gas stream from a gas-to-liquid (GTL) hydrocarbon production process could contain 2-10% methane, 20-50% hydrogen, 0-10% nitrogen, 10-30% $CO_2$, 20-40% CO, 0-3% water, 0-2% argon, and 0.1-5.0% helium.

Figure 1A:
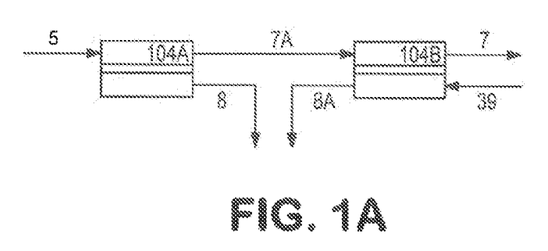
FIG. 1A is a schematic illustrating the flow configuration for a membrane when a sweep stream is used.

Low-pressure feed (2) is compressed to a preferred pressure of about 200-650 psia in feed compressor (101) to form compressed feed stream (3), which is heated in heat exchanger (102) against a first membrane retentate (7) and/or first membrane permeate (6) depending on which stream is larger. If the hydrogen content in the feed gas (1) is high, the first membrane permeate stream (6) will be larger than the first membrane retentate stream (7), and would be used to heat the compressed feed stream (3) (not shown). Alternatively, and although not shown, first membrane permeate and retentate can both be used to heat the compressed feed (3). The minimum approach temperature in heat exchanger (102) could be anywhere from 25-50° C. The heated compressed feed (4) is further heated in heater (103) to the preferred operating temperature of first hydrogen membrane separator (104) to form the first hydrogen membrane feed (5). These membranes operate only at elevated temperature and, for example, can be of palladium, palladium alloy, vanadium, niobium, tantalum, ceramic proton conducting materials such as $BaCeO_3$, and other materials that selectively permeate hydrogen and do not permeate helium, or combinations thereof. Some example membranes are those described in U.S. Pat. Nos. 6,281,403, 6,899,744, 7,781,049, and 8,101,243, which are incorporated herein by reference in their entirety. Preferred operating temperature for Pd or Pd alloy based membranes is 250-550° C. Preferred temperature for proton conducting ceramic membranes is 550-1000° C. First hydrogen membrane separator (104) is utilized to separate first hydrogen membrane feed (5) into a first membrane retentate (7) and a hydrogen containing first membrane permeate (6). Depending on the concentration of hydrogen in the membrane feed, and the target product recovery, hydrogen membrane separator (104) may contain one or more stages that selectively permeate hydrogen. The hydrogen membrane's hydrogen flux is dependent on the hydrogen partial pressure difference. As hydrogen is removed from the feed stream, partial pressure driving force decreases and membrane area required for removing additional hydrogen increases. To keep membrane area within a reasonable limit, hydrogen is removed until minimum partial pressure difference or partial pressure pinch is reached. There is, therefore, a limitation to the driving force and how much hydrogen can be separated based on the permeate hydrogen partial pressure. A sweep stream can be used to decrease the hydrogen partial pressure on the permeate side of the hydrogen membrane separator(s) to increase hydrogen flux through the membrane and to increase the hydrogen recovery from the feed. By way of example, a multistage hydrogen membrane separator can consist of two stages as shown in FIG. 1A. The first membrane stage (104A) has no sweep stream on the permeate side. The first membrane stage retentate (7A) is fed to a second membrane stage (104B) which has a sweep stream (39) on the permeate side. Pure hydrogen is recovered in the first membrane permeate (6) from the first membrane stage (104A). A sweep stream (39) mixes with the permeated hydrogen of the second membrane stage to form hot permeate (6A). The hot permeate (6A) will be a mixture of permeated hydrogen and sweep stream composition. The sweep stream must be a gas or vapor at the operating conditions of the hydrogen transport membrane (104). A preferred sweep stream composition can be selected to be compatible with returning the high-pressure hydrogen product (24) to the operating process. For example, nitrogen is a preferred sweep stream for returning the high-pressure hydrogen-nitrogen mixture product to an ammonia synthesis process. Alternatively, steam can be selected as the sweep stream composition and removed by condensation to recover relatively pure hydrogen product at high pressure to eliminate the compressor (123) completely or to reduce the pressure ratio required in the compressor. The preferred pressure of the sweep stream is determined by the trade-off between the capital cost of membrane versus capital and operating costs of the compressor. The hydrogen partial pressures on the hot permeate side must be less than the hydrogen partial pressure on the retentate side at all points along the length of the hydrogen transport membrane. Preferably the sweep stream flows countercurrently to the hot membrane feed, maximizing the allowable pressure of the hot permeate.

With reference back to FIG. 1, retentate (7) provides heat to compressed feed (3) in heat exchanger (102) to form warm retentate (8). The warm retentate (8) is predominantly inclusive of higher boiling components, but still containing about 3-30% (by volume) hydrogen. Warm retentate (8) is mixed with membrane recycle stream (9), and is further cooled in cooler (106) to about 25-50° C. to form size-selective membrane separator feed stream (10). Membrane feed stream (10) enters size-selective membrane separator (200) and is separated into size-selective membrane separator permeate (16) and size-selective membrane separator retentate (13). Size-selective membrane separator (200) can consist of a single membrane stage or more than one membrane stage with internal recycle and compression and contains a membrane or membranes that separate the lighter components, helium and hydrogen, from the higher-boiling components, such as nitrogen and/or methane, with sufficient selectivity to enable recovery of a permeate stream (16) containing at least 95% concentration (by volume) of hydrogen plus helium. These membranes (107, 108, 110) can be polymeric membranes that separate gases based on molecular size or other appropriate membranes that selectively permeate helium over larger gas molecules. An example of the membrane that can be utilized is described in U.S. Pat. No. 5,224,350 which is incorporated herein by reference, in its entirety. The size-selective membrane separator retentate (13) can be returned to the operating process or vented depending on the value of the stream.

An example of a multistage size-selective membrane separator system with internal recycle and internal compressor is shown in FIG. 1. This configuration and many other multi-stage membrane processes are described in more detail in U.S. Patent Application Publication No. 2013/0098242A1, which is incorporated herein as reference, in its entirety. Another example multistage size-selective membrane separator is described in U.S. Pat. No. 7,604,681, also incorporated herein as reference, in its entirety.

With reference back to FIG. 1, all the stages in the size selective membrane separator operate at a temperature of about 25-50° C. Size-selective membrane feed (10) at 200-650 psia contains about 0.1-5% helium and 70-95% higher boiling point components, enters first-stage membrane separator (107). Size selective membrane feed (10) is separated into first-stage membrane retentate (11) containing about 85-98% higher boiling point components at slightly below the pressure of size selective membrane feed (10), and first-stage membrane permeate (12) containing about 20-40% higher boiling point components and about 60-80% low boiling components (hydrogen and helium) at 50-100 psia.

First-stage membrane retentate (11) is routed to second-stage membrane separator (108) where it is separated into size-selective membrane separator retentate (13) at slightly below the pressure of first-stage membrane retentate (11), and second-stage membrane permeate (14) at near ambient pressure containing about 1-15% helium. Size selective membrane separator retentate (13) has a helium concentration of less than 0.1% and contains >99% of high boiling point components, which can be vented to the atmosphere or utilized as fuel. First-stage membrane permeate (12) is routed to third-stage membrane separator (110), where it is separated into size-selective membrane separator permeate (16) containing about 5-20% helium, 70-90% hydrogen, and less than 2% higher boiling point components at 15-30 psia, and third-stage membrane retentate (15) containing about 0.1-5% helium at slightly below the pressure of the first-stage membrane permeate (12). Third-stage membrane retentate (15) and second-stage membrane permeate (14) are compressed in membrane recycle compressor (109) to a pressure at least as high as the pressure of the warm retentate stream (8), forming membrane recycle stream (9). Membrane recycle compressor (109) is a multistage compressor with intercoolers.

The size-selective membrane separator permeate (16) is compressed to a preferred pressure of about 200-650 psia in compressor (111) to form compressed helium containing stream (17). Compressed helium containing stream is then heated against second hydrogen permeate (20) in heat exchanger (112), forming heated compressed feed (18). The minimum approach temperature in heat exchanger (112) could be anywhere from 25-50° C. Heated compressed feed (18) is further heated in heater (113) to the preferred membrane operating temperature of 250-550° C., in the case of Pd membranes, to form second hydrogen membrane feed (19). Second hydrogen membrane separator (105) then separates second hydrogen membrane feed into second hydrogen permeate (20) and helium-rich retentate (25). Similar to first hydrogen separator (104), second hydrogen membrane separator (105) may consist of one or more hydrogen transport membranes with or without a sweep stream. Second hydrogen membrane separator (105) allows for additional separation of residual hydrogen not removed in membrane separator (104), resulting in helium-rich retentate (25) containing at least about 80% helium. Second hydrogen permeate (20) provides heat to compressed helium containing stream (17) in heat exchanger (112) and forms cooled second hydrogen permeate (21) at a temperature that is dependent on the temperatures and volumes of the compressed helium containing stream (17) and second hydrogen permeate (20) stream.

First hydrogen permeate (6) from first hydrogen membrane separator mixes with cooled second hydrogen permeate (21) from second hydrogen membrane separator (105) and exits as combined hydrogen permeate (22). Combined hydrogen permeate (22) is cooled in a cooler (122) to a temperature of about 20-50° C. and then compressed in hydrogen compressor (123) to produce high-pressure hydrogen product (24). High-pressure hydrogen product (24) can be returned to the operating process or recovered for other purposes. If returned, it can be compressed to the operating pressure of the unit operation in the process to which hydrogen is returned. For ammonia and methanol production processes, hydrogen can be returned to the syngas production section just upstream of the syngas compressor, typically 200-500 psia. For a GTL process, hydrogen can be returned upstream of the Fischer-Tropsch reactor at 300-500 psia. If hydrogen is recovered for other purposes, it will typically be compressed to tube trailer, pipeline, or cylinder operating pressure, generally between 500-2500 psia.

With reference back to FIG. 1, the helium-rich retentate (25) may still contain about 1-10% hydrogen. If desired, this residual hydrogen can be removed in an oxidation unit (126) by reaction with oxygen. Helium-rich retentate (25) is cooled in cooler (124) to approximately 20-70° C. and then fed to the oxidation unit (126) along with an oxidant (38). The oxidant (38) can be oxygen-containing gas, such as oxygen, oxygen-enriched air, or air. Oxidation unit (126) could contain catalyst to promote the oxidation reaction. Reaction between hydrogen and oxygen produces water vapor and raises the temperature in the oxidation unit due to the exothermic nature of the reaction. Preferably, the amount of oxidant supplied is set such that the oxygen is in stoichiometric amount necessary for reaction with hydrogen in retentate for reaction (1) to consume remaining hydrogen or in slight excess.

$$2H_2 + O_2 \rightarrow 2H_2O \tag{1}$$

The oxidation unit effluent (28) is cooled in cooler (127) to condense out water vapor. Cooled effluent (29) is separated in phase separator (128) into water (30) and gas stream (31) containing helium. The gas stream (31) is further dried in dryer (129) to produce crude helium product (33) and removed water stream (32). If the hydrogen content of the retentate (25) is above about 5%, the temperature rise in the oxidation unit could be too high, causing problems with the materials of construction of the unit or the catalyst or reaction with methane when present. Typically, operating temperatures below about 375° C. are desirable. In this case, the oxidation unit (126) may be comprised of more than one oxidation stage, as shown in FIG. 1B, or require recycle, as shown in FIG. 1C to limit the increase in operating temperature due to heat released by oxidation.

Figure 1B:
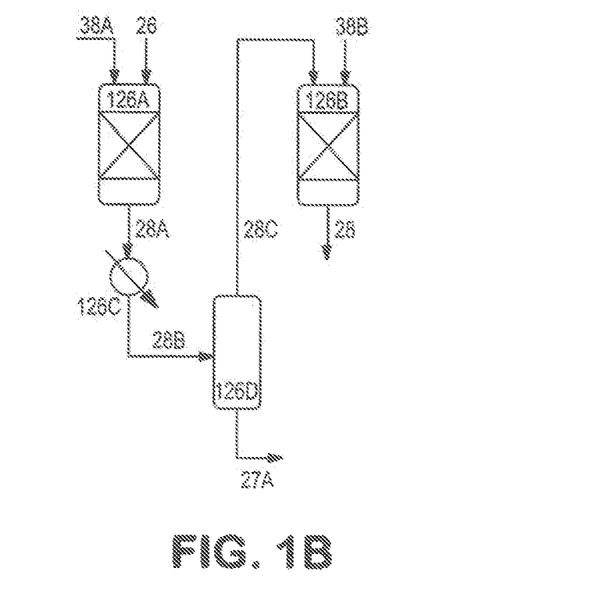
FIG. 1B is a schematic illustration of one or more oxidation units in the embodiment of FIG. 1.

For instance, a retentate stream that contained about 5-10% hydrogen by volume might require two stages, such as (126A) and (126B) in FIG. 1B. The oxidation product stream (28A) from the first oxidation stage (126A) is cooled in interstage cooler (126C) to about 20-50° C. before the cooled first-stage product (28B) is fed to interstage phase separator (126D) to remove condensed water (27A) while the interstage gas phase stream (28C) is fed to the second oxidation stage (126B) where it is mixed with second-stage oxidant (38B), producing oxidation unit effluent (28). In the case of a dual-stage or multi-stage oxidation unit, the amount of oxidant supplied to each stage would be limited so that only a portion of the hydrogen in the retentate would be oxidized in each stage. The oxidant supplied in the last stage of the dual-stage or multi-stage oxidation unit will be in the stoichiometric amount necessary to consume the residual hydrogen entering the last stage. Fresh oxidant (38A) and (38B) would be supplied to each stage to consume the amount of hydrogen necessary to limit the operating temperature while still consuming sufficient hydrogen to provide a helium product with appropriate purity.

Figure 1C:
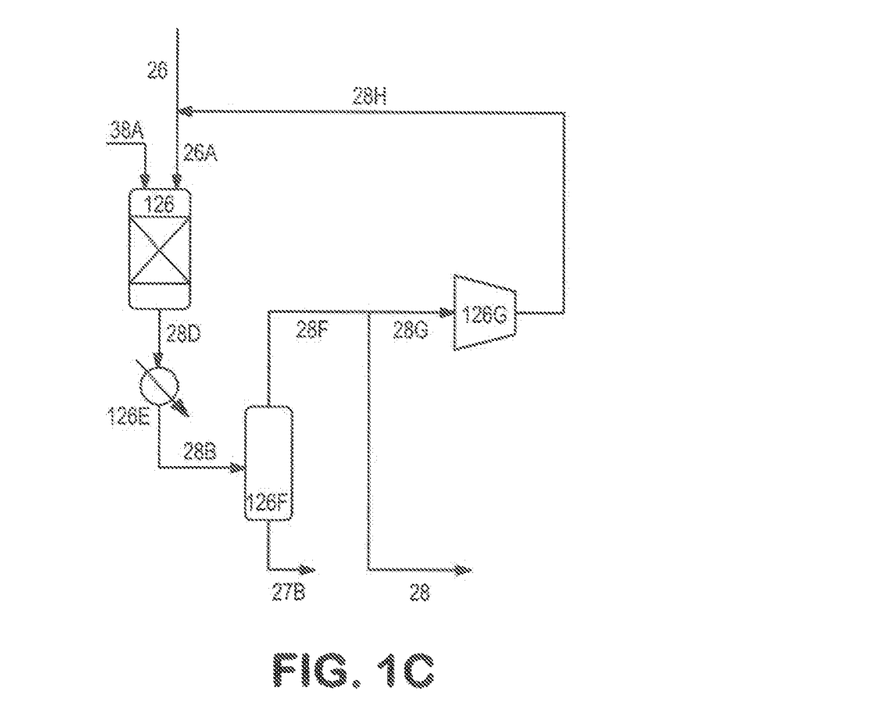
FIG. 1C is a schematic illustration of the oxidation unit utilized in the embodiment of FIG. 1 with a recycle loop.

Alternatively, and as illustrated in FIG. 1C, a single oxidation unit with recycle could be employed such that a combined feed entering the oxidation unit would contain 5% or less hydrogen (by volume). In this configuration, a recycled portion (28H) of the oxidation unit effluent (28D) can be recycled to the oxidation unit (126) inlet using oxidation recycle blower or compressor (126G) to dilute the hydrogen concentration to less than 5%, thus limiting the temperature rise in the oxidation unit (126). The oxidation unit effluent (28D) is cooled in cooler (126E) to produce cooled oxidation effluent (28E), which is fed to phase separator (126F) that removes condensed water (27B). The gas stream 28F exiting phase separator (126F) is split into recycled portion (28G), which is compressed in recycle compressor (126G), producing compressed recycled portion (28H) and combined with retentate (26) to produce diluted retentate (26A), and oxidation unit effluent (28). The relative split is done to ensure that enough material is recycled to maintain the hydrogen concentration in the diluted retentate (26A) at less than about 5%.

Referring back to FIG. 1, crude helium product (33) can be recovered as product or sent for further purification to helium purifier (130) to produce purified helium product (35) and helium purifier tailgas (34). Purified helium product (35) contains more than 98% helium. Purification is accomplished using adsorption as described U.S. Pat. No. 5,080,694, a combination of membrane separation and adsorption as described in U.S. Pat. No. 5,632,803, a combination of liquefaction and adsorption as described in U.S. Pat. No. 4,659,351, or other appropriate means. The disclosure of these patents is incorporated herein by reference in their entirety. Helium purifier tailgas (34) contains helium and is compressed in tail gas compressor (131) to produce compressed tail gas (39), which is combined with mixed gas (1) and fed to the inlet of the helium recovery process. Purified helium product (35) can be compressed to a pressure of 2,000-4,000 psia in compressor (121) to produce purified, compressed helium product (36).

Figure 2:
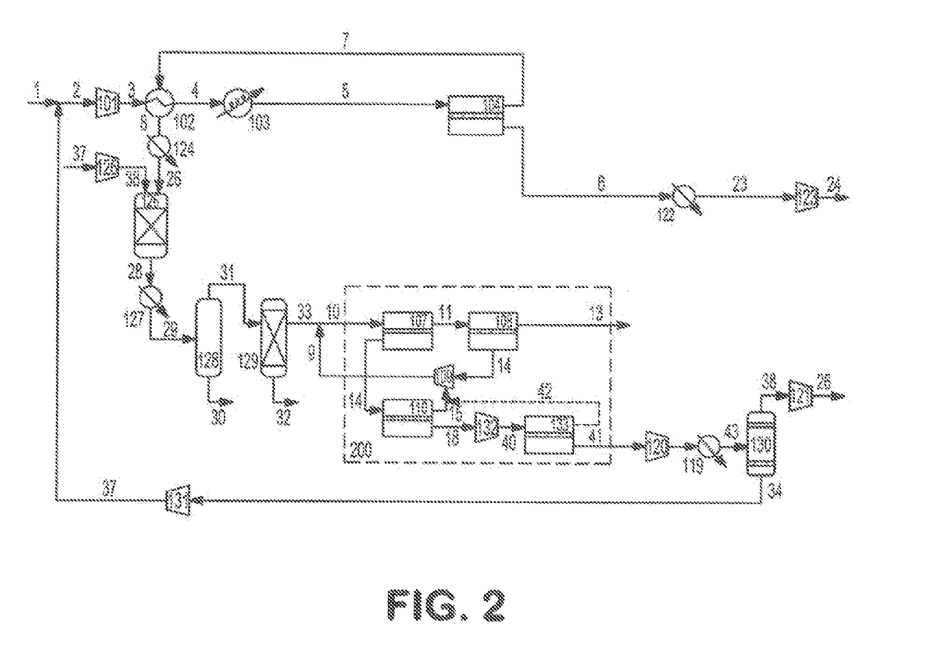
FIG. 2 is a graphical representation of another embodiment of the present invention wherein the oxidation unit(s) and the separator(s) are disposed upstream of size-selective membrane separator.

Another exemplary embodiment of the present invention is shown in FIG. 2. All unit operations from the mixed gas (1) through the first membrane separator (104) are as described for FIG. 1. In this embodiment, the 3-30% (by volume) residual hydrogen in the hot retentate (7) from the first membrane separator (104) is first removed in an oxidation unit (126) by reaction with oxygen, and then fed to a size-selective membrane separator (200) to separate the higher-boiling components from the helium product. The permeate (6) is cooled in a cooler (122) to near ambient temperature and then compressed in hydrogen compressor (123) to produce high-pressure hydrogen product (24). The warm retentate (8) is cooled in cooler (124) to approximately 20-70° C. and then fed to the oxidation unit to remove residual hydrogen, as previously described. The oxidation unit effluent (28) is cooled in cooler (127) to condense out water vapor. Cooled effluent (29) is separated in phase separator (128) into water (30) and gas stream (31) containing helium. The gas stream (31) is further dried in dryer (129) to produce dried helium-containing stream (33).

Dried helium-containing stream (33) is mixed with membrane recycle stream (9) to form size selective membrane feed (10), which is sent to the size-selective membrane separator (200) for separation of higher boiling components from helium. In this embodiment, the size-selective membrane separator (200) consists of four membrane stages (107, 108, 110, and 133) with internal recycle (9) and two internal compressors (109, and 132). One difference in this embodiment is that all of the hydrogen has been removed from the feed prior to entering the size-selective feed membrane separator. Size-selective membrane feed (10) with helium concentration of about 0.1-15% and >85% concentration of higher boiling point components enters first-stage membrane separator (107). First to third stage membrane separators (107, 108, 110) are configured as previously described. Size selective membrane separator retentate (13) has a helium concentration of less than 0.1% and contains >99% of higher boiling point components, which can be vented to the atmosphere or utilized as fuel. The third-stage membrane permeate (16) is at near ambient pressure and has a helium concentration of more than 80% (by volume). If higher purity is required, and all of the higher boiling point molecules are to be removed further, the third-stage membrane permeate (16) can be compressed in compressor (132) to about 50-100 psia and fed to a fourth-stage membrane separator (133) where the size-selective membrane separator permeate (41) has more than 98% helium purity and less than 1% concentration of higher boiling point components. The fourth-stage membrane retentate (42) has a helium concentration of 5-30% and can be vented or recycled by combining with third stage membrane retentate (15). Size-selective membrane separator permeate (41) is at near ambient pressure and is compressed in helium compressor (120) to about 300-600 psia, and cooled to near ambient temperature in cooler (119) to produce a crude helium product (43).

Crude helium product (43) can be recovered as product or sent for further purification to helium purifier (130) to produce purified helium product (35) and helium purifier tailgas (34). In the case that purified helium product (35) is desired, the fourth stage in the size selective membrane separator can be eliminated since all the remaining impurities present in the third-stage membrane permeate (16) can be removed by the helium purifier (130). Third-stage membrane permeate can then be compressed in helium compressor (120) and cooled in cooler (119) to form crude helium product (43). The helium purifier tailgas (34) is compressed in tail gas compressor (131) to produce compressed tail gas (39), which is recycled to the inlet of the process to recover residual helium. As mentioned in the description of FIG. 1, the helium purifier can be a pressure swing adsorption unit, a combination of a membrane separator and adsorption unit, a combination of a liquefier and adsorption unit, or other appropriate means. Purified helium product (35) can be compressed to a pressure of 2,000-4,000 psia in compressor (121) to produce purified, compressed helium product (36).

The invention is further explained through the following Examples, which are based on various embodiments of the system, but are in no way to be construed as limiting the present invention.

EXAMPLE 1

In the embodiment of FIG. 1, 377 lbmol/hr of feed gas (1) consisting of 60% methane, 30% hydrogen, 9% nitrogen, 0.5% helium, and 0.5% argon is fed to the process of this embodiment. Feed compressor (101) raises the pressure of the feed gas to 606 psia. The stream is heated to 350° C. and sent to first hydrogen transport membrane separator (104), consisting of two stages with a nitrogen sweep stream on the permeate side of the second stage. Portion of the hydrogen is recovered as pure hydrogen in the form of first hydrogen permeate (6) from the first stage, and portion of the hydrogen is recovered as a hydrogen-nitrogen mixture from the second stage in the form of hot permeate (6A). The first hydrogen membrane separator removes 87.7% of the hydrogen in the feed stream so that first membrane retentate (7) has a flow rate of 279 lbmol/hr and contains 0.8% helium and 5% hydrogen. This stream is then cooled, mixed with membrane recycle stream (9), and further cooled before it is fed to a polymeric membrane separator (200), consisting of three stages. The polymeric membrane separator removes 99.9% of the higher boiling point components, methane and nitrogen. The helium recovery from the polymeric membrane separator is 95.6% and the permeate stream (16) has a helium concentration of 15%. The helium concentration retentate stream (13) is less than 0.05%. The permeate (16) from the polymeric membrane separator is then compressed to 606 psia, heated to 350° C. and fed to a second hydrogen membrane separator (105) to remove the residual 11% of the hydrogen originally present in the feed stream. The second hydrogen membrane separator also consists of two stages with a nitrogen sweep stream on the permeate side of the second stage similar to what is shown in FIG. 1A. Portion of the hydrogen is recovered as pure hydrogen in the form of second hydrogen permeate (20) from the first stage, and portion of the hydrogen is recovered as a hydrogen-nitrogen mixture from the second stage in the form of second hot permeate 20A (not shown in figure). The second hydrogen membrane separator is able to remove almost all of the residual hydrogen, leaving the helium-rich retentate (25) with 5% hydrogen, and 86% helium. This stream is combined with 0.3 lbmol/hr of air and fed to oxidizer (126) to remove substantially all of the residual hydrogen by reacting it with oxygen from the air. After water is removed, stream (33) has a flow rate of 2.7 lbmol/hr, has a concentration of 82% helium and at most a trace of hydrogen. This stream can be further purified in helium purifier (130) to produce a stream that is substantially pure helium with a flow rate of 1.8 lbmol/hr. The overall helium recovery of this process is 94.6%.

Conditions and compositions of selected streams for Example 1 are shown in Table 1.

TABLE 1

Stream conditions and compositions for Example 1.

| | Stream No. | | | | | | | |
|---|---|---|---|---|---|---|---|---|
| | 1 | 3 | 4 | 5 | 6 | 6A | 7 | 8 |
| Temp (C.) | 38 | 132 | 293 | 350 | 350 | 350 | 350 | 160 |
| Press. (psia) | 49 | 606 | 601 | 600 | 25 | 25 | 590 | 585 |
| Flow (lbmol/hr) | 377 | 378 | 378 | 378 | 87 | 45 | 279 | 279 |
| Composition (%) | | | | | | | | |
| Helium (He) | 0.5 | 0.6 | 0.6 | 0.6 | 0 | 0 | 0.8 | 0.8 |
| Hydrogen ($H_2$) | 30 | 29.9 | 29.9 | 29.9 | 100 | 27.4 | 5.0 | 5.0 |
| Nitrogen ($N_2$) | 9.0 | 9.1 | 9.1 | 9.1 | 0 | 72.6 | 12.3 | 12.3 |
| Argon (Ar) | 0.5 | 0.5 | 0.5 | 0.5 | 0 | 0 | 0.7 | 0.7 |
| Methane ($CH_4$) | 60 | 59.9 | 59.9 | 59.9 | 0 | 0 | 81.2 | 81.2 |
| Water ($H_2O$) | 0 | 0 | 0 | 0 | 0 | 0 | 0 | 0 |
| Oxygen ($O_2$) | 0 | 0 | 0 | 0 | 0 | 0 | 0 | 0 |

TABLE 1-continued

Stream conditions and compositions for Example 1.

| | Stream No. | | | | | | | |
|---|---|---|---|---|---|---|---|---|
| | 10 | 13 | 16 | 17 | 18 | 19 | 20 | 20A |
| Temp (C.) | 38 | 38 | 38 | 185 | 301 | 350 | 350 | 350 |
| Press. (psia) | 585 | 580 | 30 | 606 | 601 | 600 | 25 | 25 |
| Flow (lbmol/hr) | 298 | 264 | 14.4 | 14.4 | 14.4 | 14.4 | 11.7 | 0.5 |
| Composition (%) | | | | | | | | |
| Helium (He) | 1.1 | 0 | 15.4 | 15.4 | 15.4 | 15.4 | 0 | 0 |
| Hydrogen ($H_2$) | 7.1 | 0.7 | 82.9 | 82.9 | 82.9 | 82.9 | 100 | 22.2 |
| Nitrogen ($N_2$) | 12.2 | 12.9 | 0.5 | 0.5 | 0.5 | 0.5 | 0 | 77.8 |
| Argon (Ar) | 0.6 | 0.7 | 0 | 0 | 0 | 0 | 0 | 0 |
| Methane ($CH_4$) | 79.0 | 85.6 | 1.2 | 1.2 | 1.2 | 1.2 | 0 | 0 |
| Water ($H_2O$) | 0 | 0 | 0 | 0 | 0 | 0 | 0 | 0 |
| Oxygen ($O_2$) | 0 | 0 | 0 | 0 | 0 | 0 | 0 | 0 |

| | Stream No. | | | | | | | |
|---|---|---|---|---|---|---|---|---|
| | 21 | 22 | 25 | 28 | 33 | 34 | 35 | 39 |
| Temp (C.) | 214 | 334 | 350 | 489 | 38 | 35 | 38 | 35 |
| Press. (psia) | 23 | 23 | 590 | 584 | 577 | 20 | 572 | 49 |
| Flow (lbmol/hr) | 11.7 | 99 | 2.6 | 2.8 | 2.7 | 0.9 | 1.8 | 0.9 |
| Composition (%) | | | | | | | | |
| Helium (He) | 0 | 0 | 85.6 | 78.3 | 82.0 | 47.8 | 100 | 47.8 |
| Hydrogen ($H_2$) | 100 | 100 | 5.0 | 0 | 0 | 0 | 0 | 0 |
| Nitrogen ($N_2$) | 0 | 0 | 2.7 | 10.9 | 11.4 | 33.1 | 0 | 33.1 |
| Argon (Ar) | 0 | 0 | 0 | 0.1 | 0.1 | 0.3 | 0 | 0.3 |
| Methane ($CH_4$) | 0 | 0 | 6.7 | 6.2 | 6.5 | 18.8 | 0 | 18.8 |
| Water ($H_2O$) | 0 | 0 | 0 | 4.5 | 0 | 0 | 0 | 0 |
| Oxygen ($O_2$) | 0 | 0 | 0 | 0 | 0 | 0 | 0 | 0 |

EXAMPLE 2

Example 2 illustrates the performance of the membrane system shown in the embodiment of FIG. 2. In this embodiment, feed compressor (101) raises the pressure of the feed gas to 506 psia. The stream is heated to 350° C. and sent to first hydrogen transport membrane separator (104), consisting of two stages with a nitrogen sweep stream on the permeate side. A portion of the hydrogen is recovered as pure hydrogen in the form of first hydrogen permeate (6) from the first stage, and portion of the hydrogen is recovered as a hydrogen-nitrogen mixture from the second stage in the form of hot permeate (6A). The first hydrogen membrane separator 87.7% of the hydrogen in the feed stream so that first membrane retentate (6) has a flow rate of 276 lbmol/hr and contains 0.8% helium and 4.2% hydrogen. This stream is cooled and combined with 28 lbmol/hr of air and fed to oxidizer (126) to remove hydrogen by reacting it with oxygen from the air. The oxidizer product (28) is cooled, separated, and dried. After water is removed, stream (33) has a flow rate of 286 lbmol/hr, contains 0.8% helium and at most a trace of hydrogen. This dried, hydrogen-free stream is then fed to a size-selective membrane separator (200), consisting of four stages. The size-selective membrane separator removes >99.9% of the higher boiling point components, methane and nitrogen. The helium recovery from the polymeric membrane separator is 95.5%, and the permeate (41) has a helium concentration of 98.5%. The helium product flow rate is 2.3 lbmol/hr. This stream can be further purified in helium purifier (130) to produce a stream that is substantially pure helium, with a flow rate of 1.8 lbmol/hr. The overall helium recovery of this process is 94.5%.

Conditions and compositions of selected streams for Example 2 are shown in Table 2.

TABLE 2

Stream conditions and compositions for Example 2

| | Stream No. | | | | | | | |
|---|---|---|---|---|---|---|---|---|
| | 1 | 5 | 6 | 6A | 7 | 8 | 10 | 13 |
| Temp (C.) | 38 | 350 | 350 | 350 | 350 | 152 | 38 | 38 |
| Press. (psia) | 49 | 500 | 25 | 25 | 490 | 485 | 473 | 469 |
| Flow (lbmol/hr) | 377 | 377 | 83 | 46 | 276 | 276 | 286 | 283 |
| Composition (%) | | | | | | | | |
| Helium (He) | 0.5 | 0.6 | 0 | 0 | 0.8 | 0.8 | 0.8 | 0 |
| Hydrogen ($H_2$) | 30 | 30 | 100 | 40 | 4.2 | 4.2 | 0 | 0 |
| Nitrogen ($N_2$) | 9.0 | 9 | 0 | 60 | 12.3 | 12.3 | 19.4 | 19.5 |
| Argon (Ar) | 0.5 | 0.5 | 0 | 0 | 0.7 | 0.7 | 0.8 | 0.8 |
| Methane ($CH_4$) | 60 | 59.9 | 0 | 0 | 82.0 | 82.0 | 79.0 | 79.7 |
| Oxygen ($O_2$) | 0 | 0 | 0 | 0 | 0 | 0 | 0 | 0 |
| Water ($H_2O$) | 0 | 0 | 0 | 0 | 0 | 0 | 0 | 0 |

| | Stream No. | | | | | | | |
|---|---|---|---|---|---|---|---|---|
| | 16 | 28 | 33 | 34 | 35 | 42 | 43 | 39 |
| Temp (C.) | 38 | 293 | 100 | 35 | 38 | 38 | 38 | 35 |
| Press. (psia) | 15 | 484 | 473 | 20 | 600 | 58 | 600 | 49 |
| Flow (lbmol/hr) | 2.8 | 298 | 286 | 0.5 | 1.8 | 0.5 | 2.3 | 0.5 |
| Composition (%) | | | | | | | | |
| Helium (He) | 82.8 | 0.8 | 0.8 | 93.0 | 100 | 16.2 | 98.5 | 93.0 |
| Hydrogen ($H_2$) | 0 | 0 | 0 | 0 | 0 | 0 | 0 | 0 |
| Nitrogen ($N_2$) | 6.6 | 18.6 | 19. | 3.5 | 0 | 31.6 | 0.7 | 3.5 |
| Argon (Ar) | 0.3 | 0.7 | 0.8 | 0.1 | 0 | 1.2 | 0 | 0.1 |
| Methane ($CH_4$) | 10.3 | 76.0 | 79.0 | 3.4 | 0 | 50.9 | 0.7 | 3.4 |
| Oxygen ($O_2$) | 0 | 0 | 0 | 0 | 0 | 0 | 0 | 0 |
| Water ($H_2O$) | 0 | 3.9 | 0 | 0 | 0 | 0 | 0 | 0 |

As shown in these embodiments a mixed feed stream having a very low concentration of helium can be processed in the integrated process and apparatus of the present invention for recovery of a helium rich stream.

While the invention has been described in detail with reference to specific embodiments thereof, it will become apparent to one skilled in the art that various changes and modifications can be made, and equivalents employed, without departing from the scope of the appended claims.

What is claimed is:

1. An integrated system for recovery of a helium rich stream and a hydrogen rich stream from a feed stream containing 10-80 volume percent hydrogen, 0.1-5.0 volume percent helium, and the balance higher boiling components, comprising:
   (a) routing the compressed and warmed feed stream to a first hydrogen transport membrane system having one or more hydrogen transport membranes for carrying out the bulk separation between a first hydrogen permeate stream and a first helium-containing retentate stream;
   (b) cooling and routing the first helium-containing retentate stream to a size selective polymeric membrane system having one or more polymeric membrane stages to remove the higher boiling components and to produce a resulting second permeate stream composed of primarily hydrogen and helium and a second retentate stream;
   (c) compressing the resulting second permeate stream in step (b) and feeding same to a second hydrogen transport membrane system having one or more hydrogen transport membranes to further recover one or more hydrogen permeate streams and a helium rich retentate product having about 80% helium or higher volume by content.

2. The integrated system of claim 1, further comprising: providing two hydrogen transport membranes disposed in series in the first hydrogen transport membrane system, where one of the membranes is purged and the other is unpurged.

3. The integrated system of claim 1, further comprising: passing the second permeate stream in step (b) through the second hydrogen transport membrane system and separating a third permeate stream from a third helium containing retentate stream having less than 20% hydrogen content by volume therein.

4. The integrated system of claim 1, further comprising: processing the first helium-containing retentate stream in the size selective polymeric membrane system, wherein this system includes three membrane stages with an internal compressor.

5. The integrated system of claim 4, further comprising: introducing the first helium-containing retentate stream into a first stage polymeric membrane and separating same into a first stage retentate stream and first stage permeate stream.

6. The integrated system of claim 5, further comprising introducing the first stage retentate stream into a second stage polymeric membrane and separating same into a second stage retentate stream and a second stage permeate stream where the second stage permeate stream is compressed, mixed with the first helium-containing retentate stream in step (b) and recycled to the first stage polymeric membrane, while the second retentate stream can be utilized as a fuel.

7. The integrated system of claim 6, further comprising: introducing the first stage permeate stream into a third stage polymeric membrane and separating same into a third stage retentate stream which is compressed, and recycled to the first stage polymeric membrane, and a resulting second permeate stream in step (b) having about 80% or higher hydrogen and helium content by volume.

8. The integrated system of claim 7, further comprising: compressing the resulting second permeate stream in step (b) and feeding same to the second hydrogen transport membrane system, wherein the system has two hydrogen membranes disposed in series and where one membrane is purged and the other is unpurged.

9. The integrated system of claim 8, wherein the resulting second permeate stream in step (b) is separated into third helium containing retentate stream and a third permeate stream.

10. The integrated system of claim 9, wherein the third helium retentate stream is routed to an oxidation unit where substantially all the remaining hydrogen is removed from the resulting effluent.

11. The integrated system of claim 10, further comprising: feeding the effluent to a gas phase separator and a dryer disposed in series, to form a crude helium product.

12. The integrated system of claim 11, wherein the crude helium product is routed to a purifier to produce a helium rich product having about 98% or higher content by volume and recycling a compressed tail gas to step (a).

13. An integrated system for recovery of a helium rich stream and a hydrogen rich stream from a feed stream containing 10-80 volume percent hydrogen, 0.1-5.0 volume percent helium, and the balance being higher boiling components, comprising:

(a) routing the compressed and warmed feed stream to a hydrogen transport membrane system having one or more hydrogen transport membranes for carrying out the bulk separation between a hydrogen permeate stream and a helium-containing retentate stream;

(b) cooling the helium-containing retentate stream and processing same in at least one catalytic oxidation unit to remove substantially all the hydrogen in the helium-containing retentate stream;

(c) routing the helium-containing retentate stream depleted of hydrogen to a phase separator to remove substantially all the water, and optionally a dryer disposed downstream of the phase separator to remove the remaining moisture; and (d) routing a dried helium-containing retentate stream from step (c) to a polymeric membrane system having one or more polymeric membrane stages and removing the higher boiling components to produce a helium rich product stream having about 80% or higher content by volume.

14. The integrated system of claim 13, further comprising: providing two hydrogen transport membranes disposed in series in the hydrogen transport membrane system, where feed stream is passed through a first hydrogen membrane where a first hydrogen containing permeate stream is separated from a first helium containing retentate stream having about 3-30% hydrogen content by volume therein.

15. The integrated system of claim 14, wherein the first hydrogen membrane is an unpurged membrane operating at a minimum hydrogen partial pressure pinch of 10 psia.

16. The integrated system of claim 14, wherein a second hydrogen membrane is a purged membrane operating at lower hydrogen partial pressure on the permeate side than the first hydrogen membrane.

17. The integrated system of claim 13, further comprising: providing four membrane stages wherein the helium-containing retentate stream is processed in the polymeric membrane system having four membrane stages with intermediate recycle and two internal compressors.

18. The integrated system of claim 13, further comprising: introducing the helium-containing retentate stream depleted of hydrogen from step (c) into a first polymeric membrane stage, wherein the helium-containing retentate stream depleted of hydrogen is further separated into a first stage permeate stream and a first stage retentate stream.

19. The integrated system of claim 18, further comprising: introducing the first stage retentate stream into a second polymeric membrane stage, wherein the first stage retentate stream is further separated into a second stage retentate stream which can be utilized as fuel and a second stage permeate stream which is compressed, mixed with the helium-containing retentate stream depleted of hydrogen from step (c), and recycled to the first polymeric membrane stage.

20. The integrated system of claim 19, further comprising: introducing the first stage permeate stream into a third polymeric membrane stage where the first stage permeate stream is separated into a third stage permeate stream having about 80% or higher helium content by volume, and a third stage retentate stream, wherein the third stage retentate stream is compressed, and recycled to the first polymeric membrane stage.

21. The integrated system of claim 20, further comprising: compressing and introducing the third stage permeate stream having about 80% or higher helium content by volume into a fourth polymeric membrane stage and separating it into a fourth stage retentate stream that can be recycled or used as a fuel and a helium rich product stream which is compressed to 300-600 psia in a multistage compressor with internal coolers to produce a helium rich product having about 98% or higher content by volume.

22. The integrated system of claim 13, wherein the feed stream composition contains hydrogen and at least 0.1% helium content by volume.

23. The integrated system of claim 1, wherein the feed stream composition comprises by volume content 0-60% methane, 30-70% hydrogen, 9-24% nitrogen, 0.5-5% argon, 0.5-1.2% helium, and the balance impurities.

24. The integrated system of claim 22, wherein the helium rich product stream is routed to a pressure swing adsorption unit to further purify said stream and produce a helium rich product having about 98% or more helium.

25. The integrated system of claim 1, wherein the feed stream composition contains hydrogen and at least 0.1% helium content by volume.

26. The integrated system of claim 13, wherein the feed stream composition comprises by volume content 0-60% methane, 30-70% hydrogen, 9-24% nitrogen, 0.5-5% argon, 0.5-1.2% helium, and the balance impurities.

27. The integrated system of claim 11, wherein the effluent fed to the gas separator is routed through a cooler prior to reaching the gas separator.

28. The integrated system of claim 13, wherein the crude helium product is routed to a purifier to produce a helium rich product having about 98% or higher content by volume and recycling a compressed tail gas to step (a).

\* \* \* \* \*